United States Patent
Kumagai et al.

(10) Patent No.: US 10,767,657 B2
(45) Date of Patent: Sep. 8, 2020

(54) AXIAL ALIGNMENT STRUCTURE FOR FLUID PRESSURE PUMP

(71) Applicant: AISIN SEIKI KABUSHIKI KAISHA, Kariya-shi (JP)

(72) Inventors: Hiroaki Kumagai, Kariya (JP); Hiroomi Ogawa, Nagoya (JP)

(73) Assignee: AISIN SEIKI KABUSHIKI KAISHA, Kariya-shi (JP)

(*) Notice: Subject to any disclaimer, the term of this patent is extended or adjusted under 35 U.S.C. 154(b) by 135 days.

(21) Appl. No.: 15/892,969

(22) Filed: Feb. 9, 2018

(65) Prior Publication Data
US 2018/0266435 A1  Sep. 20, 2018

(30) Foreign Application Priority Data
Mar. 16, 2017  (JP) .................. 2017-051799

(51) Int. Cl.
*F04D 29/02* (2006.01)
*F04D 29/62* (2006.01)
(Continued)

(52) U.S. Cl.
CPC ............ *F04D 29/426* (2013.01); *B29C 65/06* (2013.01); *B29C 65/0672* (2013.01);
(Continued)

(58) Field of Classification Search
CPC ...... F04D 29/426; F04D 29/628; F04D 29/40; F04C 2/10; B29C 65/06; B29C 66/322; H02K 15/14
(Continued)

(56) References Cited

U.S. PATENT DOCUMENTS 3,658,275 A * 4/1972 Jurgen Lahmann ... B65H 75/22
242/118.4
5,670,108 A * 9/1997 Kern ....................... B29C 65/20
264/248
(Continued)

FOREIGN PATENT DOCUMENTS

JP    2005081736 A  *  3/2005
JP    2009221942 A  * 10/2009  ......... F04D 13/0606
(Continued)

OTHER PUBLICATIONS

English Translation of JP2005081736A (Year: 2005).*
(Continued)

*Primary Examiner* — Eldon T Brockman
*Assistant Examiner* — Wesley Le Fisher
(74) *Attorney, Agent, or Firm* — Oblon, McClelland, Maier & Neustadt, L.L.P.

(57) ABSTRACT

An axial alignment structure for a fluid pressure pump (100) includes: a first housing made of a resin; and a second housing made of a resin, in which a housing is configured in a state where the first housing and the second housing are joined to each other by thermal welding at a welding position, and a pump rotor is accommodated in the housing, and the first housing and the second housing have an axial alignment mechanism that axially aligns the first housing and the second housing such that axes of the first and second housings coincide with each other at the time of joining of the first housing and the second housing to each other by the thermal welding.

4 Claims, 6 Drawing Sheets

(51) Int. Cl.
- *F04D 29/42* (2006.01)
- *B29C 65/00* (2006.01)
- *H02K 5/08* (2006.01)
- *H02K 15/14* (2006.01)
- *F04D 13/06* (2006.01)
- *H02K 7/14* (2006.01)
- *B29C 65/20* (2006.01)
- *B29C 65/08* (2006.01)
- *B29C 65/06* (2006.01)
- *B29C 65/78* (2006.01)
- *B29L 31/00* (2006.01)

(52) U.S. Cl.
CPC .............. *B29C 65/08* (2013.01); *B29C 65/20* (2013.01); *B29C 65/7814* (2013.01); *B29C 66/1142* (2013.01); *B29C 66/124* (2013.01); *B29C 66/1312* (2013.01); *B29C 66/30223* (2013.01); *B29C 66/54* (2013.01); *B29C 66/73921* (2013.01); *B29C 66/81422* (2013.01); *B29C 66/8322* (2013.01); *F04D 13/06* (2013.01); *F04D 29/02* (2013.01); *F04D 29/026* (2013.01); *F04D 29/628* (2013.01); *H02K 5/08* (2013.01); *H02K 7/14* (2013.01); *H02K 15/14* (2013.01); *B29L 2031/7496* (2013.01); *F05D 2230/232* (2013.01); *F05D 2300/44* (2013.01)

(58) Field of Classification Search
USPC ..................................... 264/68, DIG. 48, 248
See application file for complete search history.

(56) References Cited

U.S. PATENT DOCUMENTS

| | | | |
|---|---|---|---|
| 6,464,374 B2 * | 10/2002 | Akiyama | B29C 66/73361 362/267 |
| 6,588,970 B1 * | 7/2003 | Natrop | B29C 65/06 403/270 |
| 9,249,905 B2 * | 2/2016 | Mezzalira | B29C 66/1162 |
| 2004/0200569 A1 * | 10/2004 | Weiblen | B29C 66/92651 156/272.8 |
| 2006/0048740 A1 * | 3/2006 | Tanikawa | B29C 65/06 123/184.61 |
| 2007/0069040 A1 * | 3/2007 | Lewis | B05B 7/066 239/8 |
| 2014/0037914 A1 * | 2/2014 | Fujimoto | B29C 65/16 428/198 |
| 2017/0146030 A1 * | 5/2017 | Furukawa | B23K 26/18 |

FOREIGN PATENT DOCUMENTS

| | | | |
|---|---|---|---|
| JP | 2013-108458 A | | 6/2013 |
| JP | 2013108458 A | * | 6/2013 |
| JP | 2016-22728 | | 2/2016 |
| JP | 2016022728 A | * | 2/2016 |
| WO | WO 2008/072438 A1 | | 6/2008 |
| WO | WO 2016/047331 A1 | | 3/2016 |

OTHER PUBLICATIONS

English Translation of JP2009221942A (Year: 2009).*
English Translation of JP2013108458A (Year: 2013).*
English Translation of JP2016022728A (Year: 2016).*
Extended European Search Report dated Jul. 20, 2018 in Patent Application No. 18156155.6.

* cited by examiner

AXIAL ALIGNMENT STRUCTURE FOR FLUID PRESSURE PUMP

CROSS REFERENCE TO RELATED APPLICATIONS

This application is based on and claims priority under 35 U.S.C. § 119 to Japanese Patent Application 2017-051799, filed on Mar. 16, 2017, the entire contents of which are incorporated herein by reference.

TECHNICAL FIELD

This disclosure relates to an axial alignment structure for a fluid pressure pump including a housing formed by joining a first housing made of a resin and a second housing made of a resin by thermal welding.

BACKGROUND DISCUSSION

JP 2016-022728 A (Reference 1) discloses a fluid pressure pump including a first member (first housing) made of a resin and a second member (second housing) made of a resin. A housing of the fluid pressure pump is formed by joining the first member and the second member to each other by thermal welding. Therefore, a pump chamber is formed in the housing. The fluid pressure pump includes a pump section and an electric motor section. The pump section includes a pump rotor, an impeller provided at an end of the pump rotor, and the pump chamber in which the impeller is accommodated. The electric motor section is provided in order to rotate the pump rotor.

As in Reference 1, in a fluid pressure pump in which a housing is configured by joining the first housing and the second housing to each other by thermal welding and a pump rotor is provided in the housing, a clearance is formed between the pump rotor and a joint portion between the first and second housings in the pump chamber. The clearance between the housing and the pump rotor needs to be as small as possible in the pump chamber of the fluid pressure pump in order to improve a pump performance.

The clearance is formed between the housing and the pump rotor after the first housing and the second housing are joined. That is, because the clearance is formed in the vicinity of the joint portion between the first and second housings, it is necessary to improve dimensional precision related to the first housing, the second housing, and a jig (pressing member), which is used to join the first and second housings to each other, in order to decrease the clearance. The dimensional precision is required in both of the axial direction of the pump rotor and a direction perpendicular to the axis of the pump rotor. For this reason, in the case of the fluid pressure pump having the housing formed by thermal welding, a process of setting an appropriate clearance between the housing and the pump rotor is complicated.

Thus, a need exists for an axial alignment structure for a fluid pressure pump which is not susceptible to the drawback mentioned above.

SUMMARY

A feature of an axial alignment structure of a fluid pressure pump according to an aspect of this disclosure resides in that the axial alignment structure of a fluid pressure pump includes a first housing made of a resin; and a second housing made of a resin, in which a housing is configured in a state where the first housing and the second housing are joined to each other by thermal welding at a welding position, and a pump rotor is accommodated in the housing, and the first housing and the second housing have an axial alignment mechanism that axially aligns the first housing and the second housing such that axes of the first and second housings coincide with each other at the time of joining of the first housing and the second housing to each other by the thermal welding.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments disclosed herein will be described with reference to the drawings.

<Overall Configuration of First Embodiment>

Figure 1:
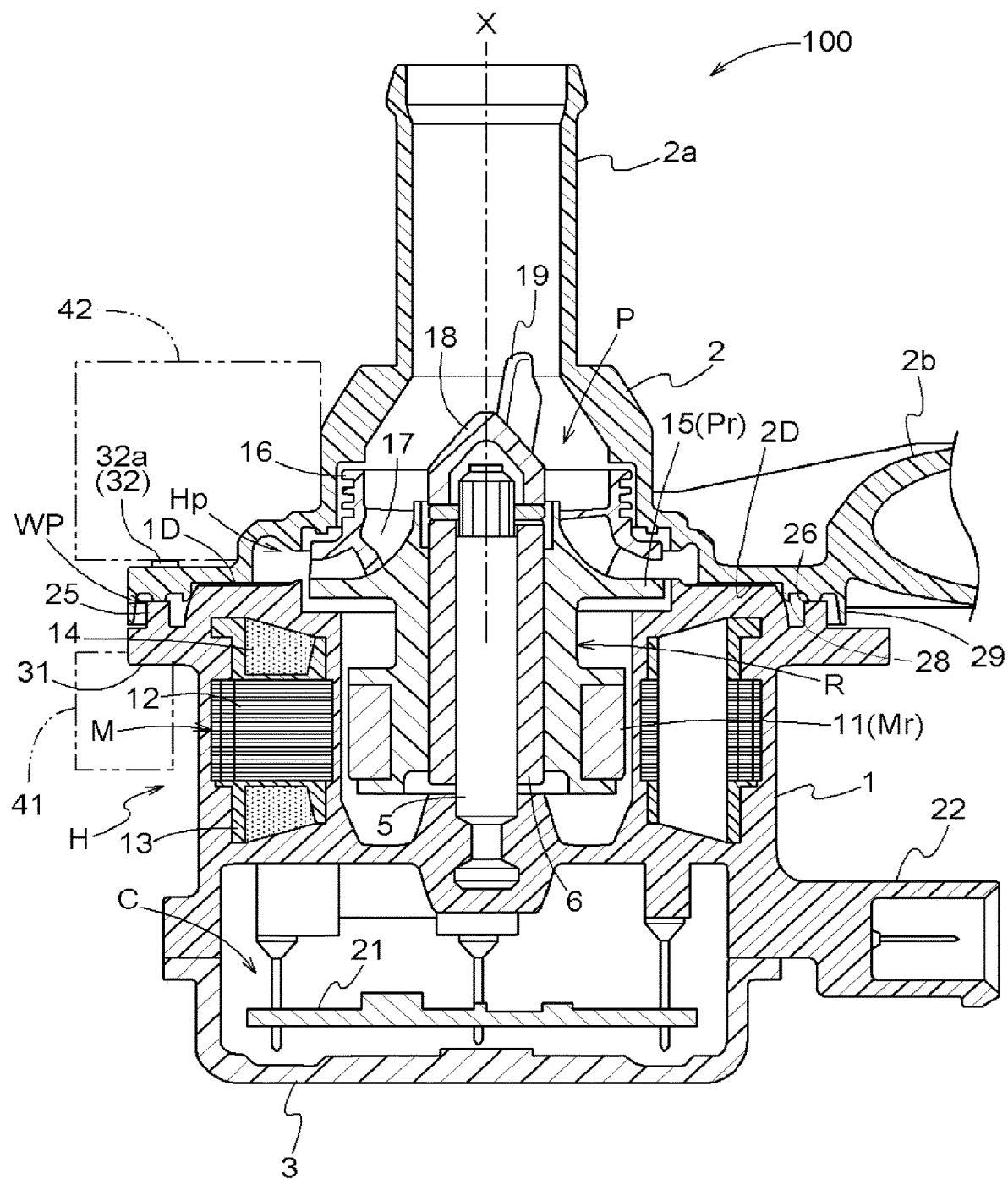
FIG. 1 is a cross-sectional view of a fluid pressure pump of a first embodiment.
Figure 2:
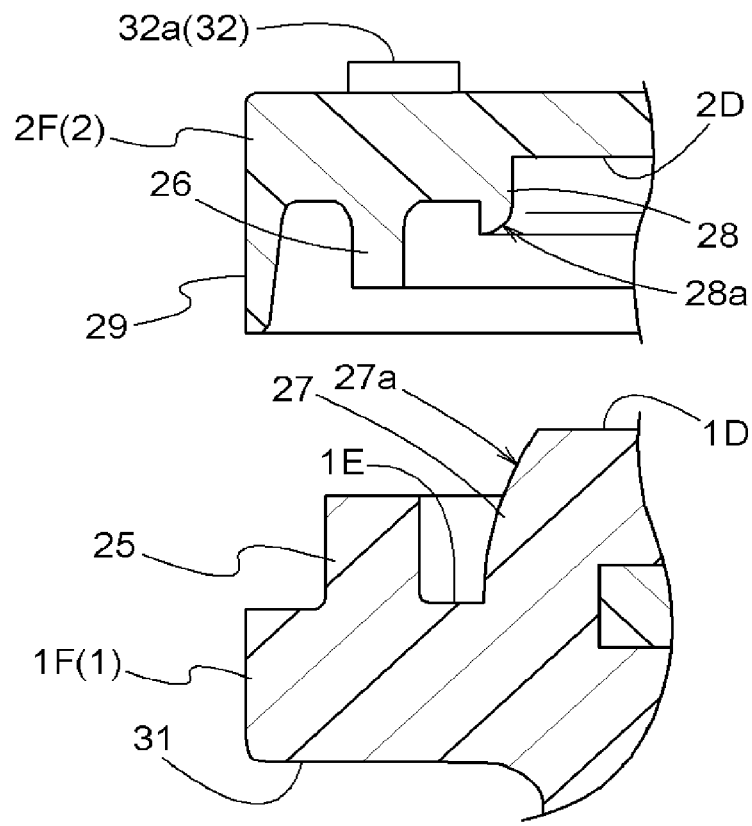
FIG. 2 is a cross-sectional view of a joint portion before welding.

As illustrated in FIGS. 1 and 2, a centrifugal fluid pressure pump 100 includes a pump section P, an electric motor section M, and a controller C. The pump section P has a pump rotor Pr disposed in a pump chamber Hp formed in a housing H. The pump rotor Pr is rotated by an electric motor section M as a driving source. The controller C controls the operation of the electric motor section M.

For example, the fluid pressure pump 100 is used as a water pump that circulates a coolant (an example of a fluid) between an engine and a radiator in a vehicle such as an automobile.

The housing H includes a first housing 1 made of a resin, a second housing 2 made of a resin, and a third housing 3 made of a resin. The electric motor section M is accommodated in the first housing 1. The pump chamber Hp is formed by welding the first housing 1 and the second housing 2. The third housing 3 is detachably provided at a side of the first housing 1 which is opposite the pump chamber Hp.

For example, a thermoplastic resin is used as the resin that constitutes the housing H. The third housing 3 may be a metallic molding instead of a resin molding. The housing H comes into a joined state as the first housing 1 and the second housing 2 are thermally welded at a welding position WP.

In the fluid pressure pump 100, a shaft 5 is disposed axially with a rotational axis X. The shaft 5 is supported in a state in which one end thereof is inserted into the first housing 1, and the other end thereof is accommodated in a guide body 18 of the second housing 2. In addition, the guide body 18 is supported by the second housing 2 through a stay 19 on an inner surface of the second housing 2. In addition, a rotor R is supported to be freely rotatable with respect to the shaft 5 via a bushing 6. In this configuration, the rotational axis X is the rotation center of the rotor R and the rotation center during spin welding (an example of thermal welding).

The rotor R has a motor rotor Mr which is formed at an inner end side (lower side in FIG. 1) of the first housing 1 and has a permanent magnet 11. The pump rotor Pr having a disk-shaped portion 15 is integrally formed at an end side (upper side in FIG. 1) of the rotor R which is disposed in the pump chamber Hp.

In the first housing 1, a stator is inserted at a position that surrounds the motor rotor Mr, and the electric motor section M is configured with the stator and the motor rotor Mr. The stator includes a stator core 12 formed by stacking multiple magnetic steel plates, an insulator 13 fitted in the stator core 12, and a coil 14 wound around the insulator 13.

The pump rotor Pr includes the disk-shaped portion 15, a shroud 16 which is provided to be rotated integrally with the disk-shaped portion 15, and multiple impellers 17. The multiple impellers 17 are disposed at an intermediate position between the disk-shaped portion 15 and the shroud 16.

The second housing 2 includes an inlet cylinder 2a, which is coaxial with the rotational axis X and a discharge cylinder 2b, which extends in a tangential direction from an outer circumference of the pump rotor Pr. The inlet cylinder 2a and the discharge cylinder 2b are formed integrally with each other. The stay 19 described above is formed on an inner surface of the inlet cylinder 2a, and the guide body 18 is provided for the stay 19.

A control board 21 is provided in the controller C in the third housing 3. The control board 21 controls driving electric power to be supplied to the coil 14 of the electric motor section M. The first housing 1 includes a connector 22 in the vicinity of the third housing 3.

The electric motor section M is controlled by the controller C, and the rotor R is rotated integrally with the pump rotor Pr such that a coolant introduced from the inlet cylinder 2a may be sent to the discharge cylinder 2b.

<Structure for Realizing Spin Welding>

The first and second housings 1 and 2 are made of a thermoplastic resin material, and the first and second housings 1 and 2 are joined to each other by spin welding at the welding position WP.

As illustrated in FIG. 2, during the spin welding, the first and second housings 1 and 2 are disposed to face each other, and the first and second housings 1 and 2 are relatively rotated about the rotational axis X at a high speed. In this state, a first welding portion 25 of the first housing 1 and a second welding portion 26 of the second housing 2 come into press contact with each other such that frictional heat, which is generated when the first and second welding portions 25 and 26 come into contact with each other, melts the contact position.

A first disk-shaped surface 1D, which is flat in a posture orthogonal to the rotational axis X, is formed at a position of the first housing 1 which faces the second housing 2. A first flange 1F, which extends outward in a posture orthogonal to the rotational axis X, is formed at a position displaced in a direction toward the third housing 3 based on the first disk-shaped surface 1D.

Figure 3:
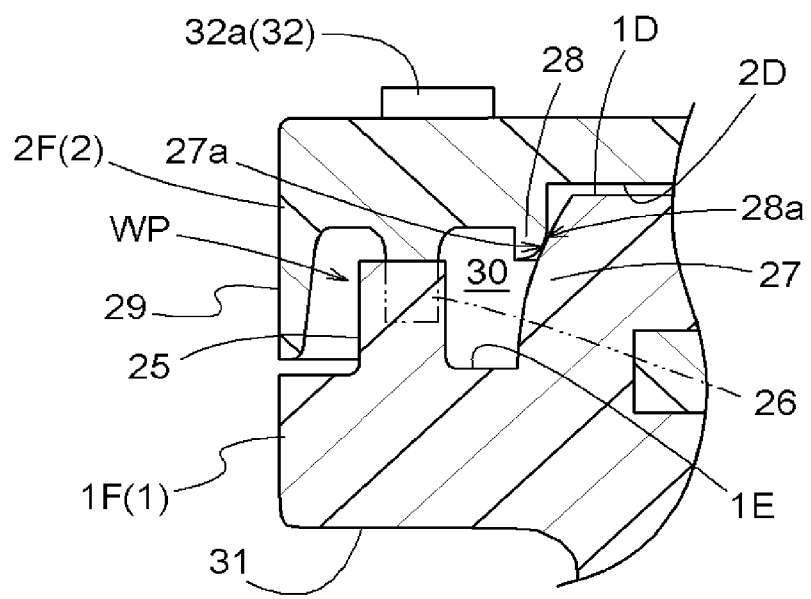
FIG. 3 is a cross-sectional view of the joint portion.

As illustrated in FIGS. 1 to 3, the first flange 1F is formed with a support surface 1E having a posture parallel to the first disk-shaped surface 1D, the first welding portion 25, and a first protruding portion 27. The first welding portion 25 is formed in an annular shape around the rotational axis X with respect to the support surface 1E. The first protruding portion 27 extends in an axial direction of the first housing 1 (direction of the rotational axis X) at a side (side adjacent to the rotational axis X) inward from the welding position WP, an outer circumferential surface of the first protruding portion 27 is inclined toward a protruding end of the first protruding portion 27 in a direction toward the rotational axis X, and the first protruding portion 27 is formed in an annular shape around the rotational axis X.

That is, the first welding portion 25 protrudes in a direction in which the second housing 2 is disposed (upward in FIG. 3), and the first protruding portion 27 is formed to have a curved outer surface so that the first protruding portion 27 approaches the rotational axis X as the first protruding portion 27 comes closer to the second housing 2.

The second housing 2 is formed with a second disk-shaped surface 2D which has a posture orthogonal to the rotational axis X at a position facing the first disk-shaped surface 1D. In addition, the second housing 2 is formed with a second flange 2F which extends outward from the second disk-shaped surface 2D and has a posture orthogonal to the rotational axis X. The second flange 2F includes the second welding portion 26, and a second protruding portion 28 provided at a side (side adjacent to the rotational axis X) inward from the welding position WP.

In the second flange 2F, the second welding portion 26 is formed in an annular shape around the rotational axis X, and an outer wall portion 29 is formed outward from the second welding portion 26 (at a side distant from the rotational axis X). The second protruding portion 28 is positioned inward from the second welding portion 26 (at a side close to the rotational axis X), and a width of the second protruding portion 28 in a radial direction based on the rotational axis X is decreased toward a protruding end thereof (downward in FIGS. 2 and 3). The second welding portion 26 is disposed at nearly the same position as the first welding portion 25 in the radial direction based on the rotational axis X. The protruding amount of the second protruding portion 28 is set such that the second protruding portion 28 comes into contact with the first protruding portion 27 when the first housing 1 and the second housing 2 are welded.

The first housing 1 has a first pressing part 31 to which pressing force is applied against the welding position WP. The first pressing part 31 is provided on a flange surface of the first flange 1F which is opposite to the second flange 2F. The second housing 2 has a second pressing part 32 to which pressing force is applied against the welding position WP. The second pressing part 32 is provided on a flange surface of the second flange 2F which is opposite to the first flange 1F. The first pressing part 31 and the second pressing part 32 are provided to apply pressing force, which brings the first housing 1 and the second housing 2 into press contact with each other during the spin welding, by pressing members (a fixing base 41 and a chuck member 42 to be described below). In the present embodiment, the second pressing part 32 is configured with multiple convex portions 32a protruding from the second flange 2F. The tip ends of the convex portions 32a are formed to be flat as pressing surfaces.

In the spin welding, as illustrated in FIG. 1, the fixing base 41 (an example of the first pressing member) which fixes the first housing 1 in the state in which a rotation of the first housing 1 is prevented and the chuck member 42 (an example of the second pressing member) which holds the second housing 2 to be rotatable about the rotational axis X are used. The fixing base 41 has a support portion 41a (an example of the first pressing portion) for supporting the first pressing part 31 of the first housing 1, and fixes the first housing 1 such that the first housing 1 is not rotated. The chuck member 42 has a pressing portion 42a (an example of the second pressing portion) which presses the second pressing part 32 of the second housing 2 against the first housing 1 along the rotational axis X.

<Spin Welding>

During the spin welding process, the rotor R is disposed in the first housing 1 so as to maintain a relative positional relationship between the first housing 1 and the second housing 2, as illustrated in FIG. 2. In this state, a shift operation is performed so as to cause the second housing 2 to approach the first housing 1 by moving the second housing 2 along the rotational axis X while driving the second housing 2 to rotate at a high speed about the rotational axis X.

In this process, the protruding ends of the first and second welding portions 25 and 26 come into press contact with each other such that the protruding ends of the first and second welding portions 25 and 26 are melted by frictional heat, and in this melted state, the shift operation is performed in the state in which predetermined pressure is applied. Further, the rotation is stopped in the state in which pressure is applied at a time point at which the first and second welding portions 25 and 26 reach the positional relationship illustrated in FIG. 3, and this stopped state is maintained only in a short period of time such that the spin welding is completed. Therefore, the first welding portion 25 and the second welding portion 26 are welded at the welding position WP.

At a time point at which the spin welding is completed, the positional relationship is set such that the first disk-shaped surface 1D of the first housing 1 and the second disk-shaped surface 2D of the second housing 2 are close to each other. Further, an annular space 30 is formed inward from the welding position WP.

<Axial Alignment Mechanism>

The first housing 1 and the second housing 2 have an axial alignment mechanism which axially aligns the first housing 1 and the second housing 2 when the first housing 1 and the second housing 2 are joined by thermal welding such that the axes of the first and second housing 1 and 2 coincide with each other. In the present embodiment, the axial alignment mechanism includes a first abutment portion 27a and a second abutment portion 28a. The first abutment portion 27a is provided at an outer circumferential side of the first protruding portion 27, and the second abutment portion 28a is provided at an inner circumferential side of the second protruding portion 28. The first abutment portion 27a and the second abutment portion 28a are formed in an R shape. As described above, the axial alignment structure of the fluid pressure pump 100 is configured by the axial alignment mechanism included in the first housing 1 and the second housing 2.

As illustrated in FIG. 3, when the first welding portion 25 and the second welding portion 26 are welded, the second abutment portion 28a of the second protruding portion 28 comes into contact with the first abutment portion 27a of the first protruding portion 27. Here, both of the first abutment portion 27a and the second abutment portion 28a are formed in an R shape. For this reason, during the spin welding, at a position at which the first abutment portion 27a and the second abutment portion 28a are in contact with each other, the first housing 1 and the second housing 2 are axially aligned such that the axes thereof coincide with each other. The spin welding is completed in this state such that the first housing 1 and the second housing 2 are joined in the state in which the axes thereof coincide with each other. Therefore, a clearance between the housing H and the pump rotor Pr is automatically set, and as a result, it is possible to reduce dimensional precision of parts, among the first housing 1, the second housing 2, and the pressing members 41 and 42, other than the axial alignment mechanism. As a result, an appropriate clearance may be simply set between the housing H and the pump rotor Pr.

During the spin welding process, the second abutment portion 28a comes into contact with the first abutment portion 27a. However, since both of the first abutment portion 27a and the second abutment portion 28a are formed in an R shape and a region in which the first abutment portion 27a and the second abutment portion 28a are in contact with each other is small, high frictional force is not applied. For this reason, the abutment portions are not likely to be welded.

<Modification of First Embodiment>

Figure 4:
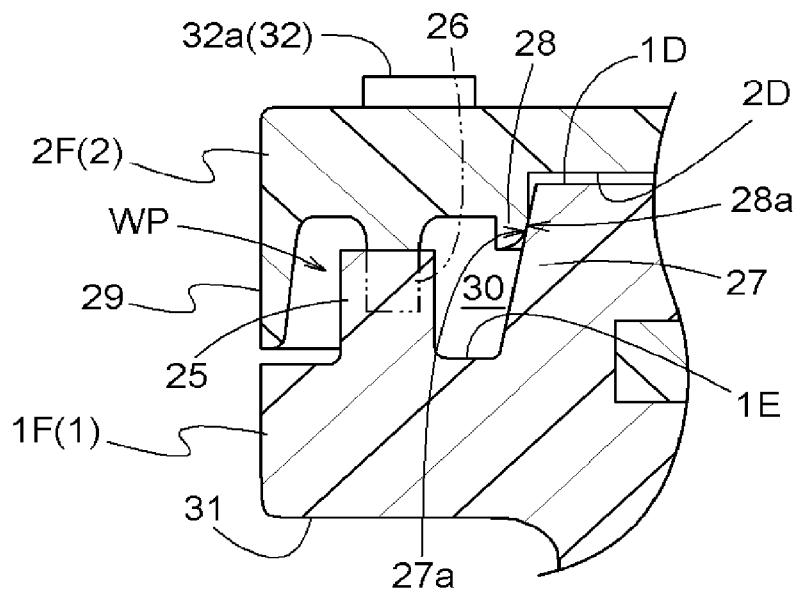
FIG. 4 is a view illustrating a modified example of the first embodiment.

As illustrated in FIG. 4, the axial alignment mechanism may be configured such that the first abutment portion 27a is formed in a tapered shape, and the second abutment portion 28a is formed in an R shape. In addition, although not illustrated, in the axial alignment mechanism, the first abutment portion 27a may be formed in an R shape, and the second abutment portion 28a may be formed in a tapered shape. One of the first abutment portion 27a and the second abutment portion 28a is formed in a tapered shape, and the other of the first abutment portion 27a and the second abutment portion 28a is formed in an R shape such that a region in which the first abutment portion 27a and the second abutment portion 28a are in contact with each other may be increased. Therefore, the first housing 1 and the second housing 2 easily become stable at the contact position between the first abutment portion 27a and the second abutment portion 28a.

Second Embodiment

Figure 5:
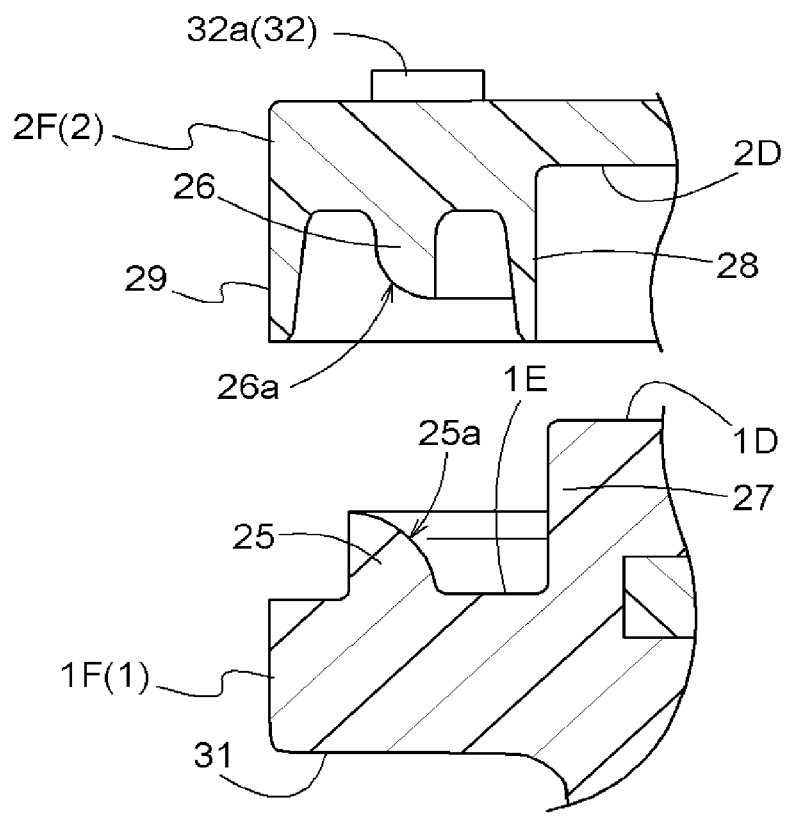
FIG. 5 is a cross-sectional view of a joint portion of a fluid pressure pump of a second embodiment before welding.
Figure 6:
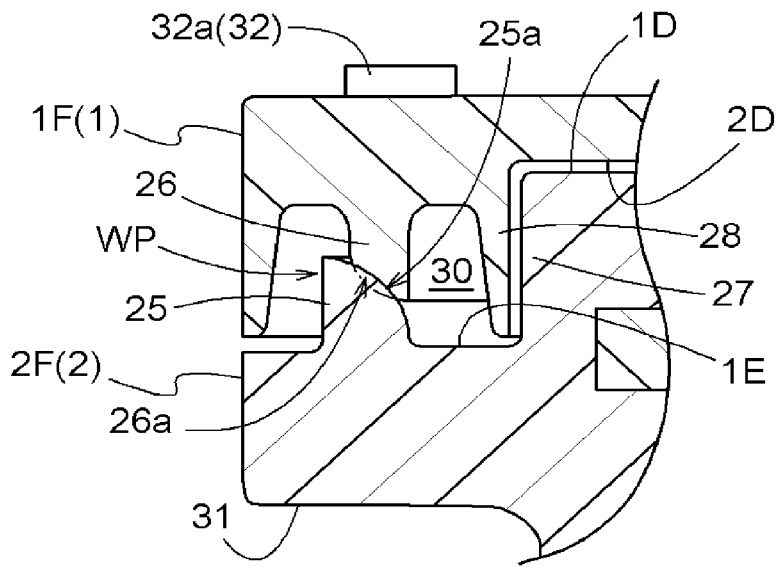
FIG. 6 is a cross-sectional view of the joint portion of the fluid pressure pump of the second embodiment.

A second embodiment has basically the same configuration as the first embodiment, but as illustrated in FIGS. 5 and 6, the second embodiment differs from the first embodiment in terms of shapes of the first and second welding portions 25 and 26. In addition, the first protruding portion 27 and the second protruding portion 28 are provided inward from the welding position WP (at the side close to the rotational axis X), but the first protruding portion 27 and the second protruding portion 28 do not come into contact with each other.

In the present embodiment, the axial alignment mechanism is configured with the first welding portion 25 of the first housing 1 and the second welding portion 26 of the second housing 2. An inner circumferential portion 25a of the first welding portion 25 in a direction in which the first welding portion 25 protrudes toward the second housing 2 is formed in an R shape. Meanwhile, an outer circumferential portion 26a of the second welding portion 26 in a direction in which the second welding portion 26 protrudes toward the first housing 1 is formed in an R shape. During the spin welding, the inner circumferential portion 25a of the first welding portion 25 and the outer circumferential portion 26a of the second welding portion 26 come into contact with each other, and as a result, the first housing 1 and the second housing 2 are axially aligned such that the axes of the first housing 1 and the second housing 2 coincide with each other.

During the spin welding process, as similarly described in the first embodiment, the relative positional relationship between the first housing 1 and the second housing 2 is maintained, and the shift operation is performed so as to cause the second housing 2 to approach the first housing 1 by moving the second housing 2 along the rotational axis X while driving the second housing 2 to rotate about the rotational axis X at a high speed.

As illustrated in FIG. 6, when the first welding portion 25 and the second welding portion 26 are welded, the outer circumferential portion 26a of the second welding portion 26 comes into contact with the inner circumferential portion 25a of the first welding portion 25. Here, both of the inner circumferential portion 25a and the outer circumferential portion 26a are formed in an R shape. For this reason, at the welding position WP, the inner circumferential portion 25a and the outer circumferential portion 26a come into contact with each other, and the first and second housings 1 and 2 are axially aligned such that the axes thereof coincide with each other. The spin welding is completed in this state such that the first housing 1 and the second housing 2 are joined in the state in which the axes thereof coincide with each other. Therefore, a clearance between the housing H and the pump rotor Pr is automatically set, and as a result, it is possible to reduce dimensional precision of parts, among the first housing 1, the second housing 2, and the pressing members 41 and 42, other than the axial alignment mechanism. As a result, an appropriate clearance may be simply set between the housing H and the pump rotor Pr.

<Modification of Second Embodiment>

Figure 7:
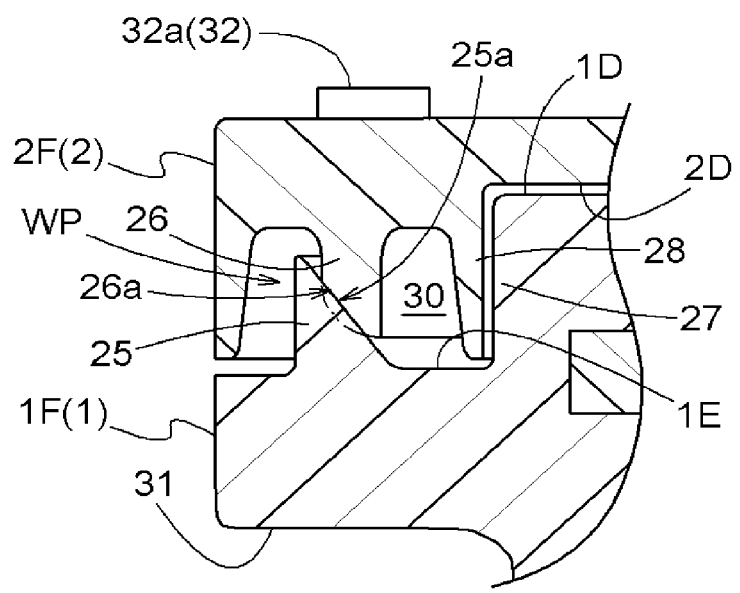
FIG. 7 is a view illustrating a modified example of the second embodiment.

As illustrated in FIG. 7, the axial alignment mechanism may be configured such that the inner circumferential portion 25a of the first welding portion 25 is formed in a tapered shape, and the outer circumferential portion 26a of the second welding portion 26 is formed in an R shape. In addition, although not illustrated, in the axial alignment mechanism, the inner circumferential portion 25a may be formed in an R shape, and the outer circumferential portion 26a may be formed in a tapered shape. One of the inner circumferential portion 25a and the outer circumferential portion 26a is formed in a tapered shape, and the other of the inner circumferential portion 25a and the outer circumferential portion 26a is formed in an R shape such that a region in which the inner circumferential portion 25a and the outer circumferential portion 26a are in contact with each other may be increased. Therefore, the first housing 1 and the second housing 2 easily become stable at the welding position WP of the first welding portion 25 and the second welding portion 26.

Third Embodiment

Figure 8:
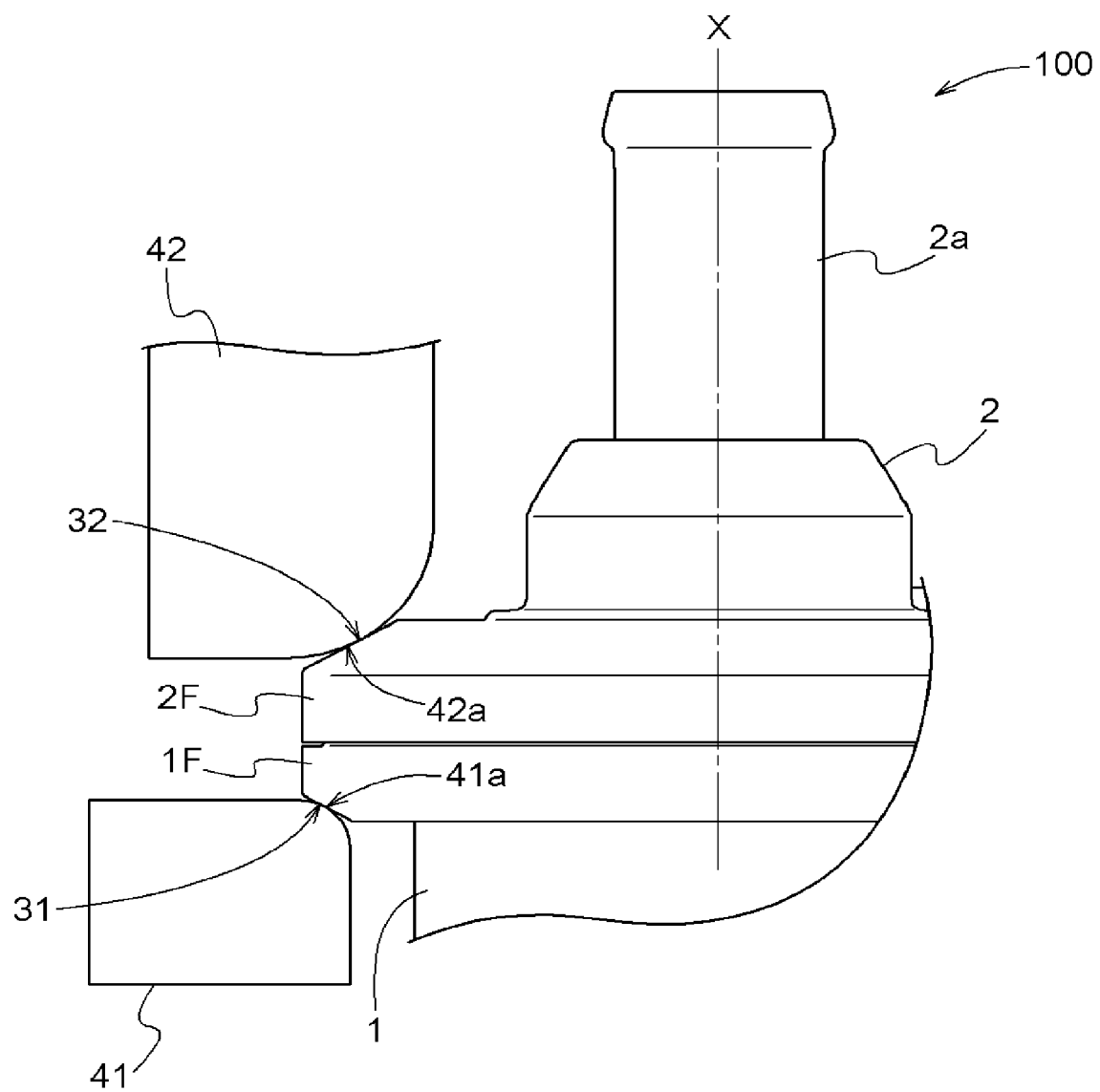
FIG. 8 is a view illustrating an axial alignment mechanism of a fluid pressure pump of a third embodiment.

In a third embodiment, as illustrated in FIG. 8, the axial alignment mechanism is configured with the pressing parts 31 and 32 of the first and second housings 1 and 2, the pressing portion 41a of the fixing base 41, and the pressing portion 42a of the chuck member 42.

In the present embodiment, between the first pressing part 31 and the first pressing portion 41a, the first pressing part 31 is formed in a tapered shape outward in the radial direction of the rotational axis X, and the first pressing portion 41a, which faces the first pressing part 31, is formed in an R shape. In addition, between the second pressing part 32 and the second pressing portion 42a, the second pressing part 32 is formed in a tapered shape outward in the radial direction of the rotational axis X, and the second pressing portion 42a, which faces the second pressing part 32, is formed in an R shape.

During the spin welding process, as described in the first embodiment, the relative positional relationship between the first housing 1 and the second housing 2 is maintained, and the shift operation is performed so as to cause the second housing 2 to approach the first housing 1 by moving the second housing 2 along the rotational axis X while driving the second housing 2 to rotate about the rotational axis X at a high speed.

The fixing base 41 and the chuck member 42 are assembling jigs, and the axes thereof coincide with each other with high precision. During the spin welding, the fixing base 41 presses the first pressing part 31, and the chuck member 42 presses the second pressing part 32 such that the first housing 1 and the second housing 2 are axially aligned, and the axes thereof may coincide with each other. The spin welding is completed in this state such that the first housing 1 and the second housing 2 are joined in the state in which the axes thereof coincide with each other. Therefore, since the clearance between the housing H and the pump rotor Pr is automatically set, it is possible to reduce the dimensional precision of parts, among the first housing 1, the second housing 2, and the pressing members 41 and 42, other than the axial alignment mechanism. As a result, an appropriate clearance can be simply set between the housing H and the pump rotor Pr.

<Modification of Third Embodiment>

Figure 9:
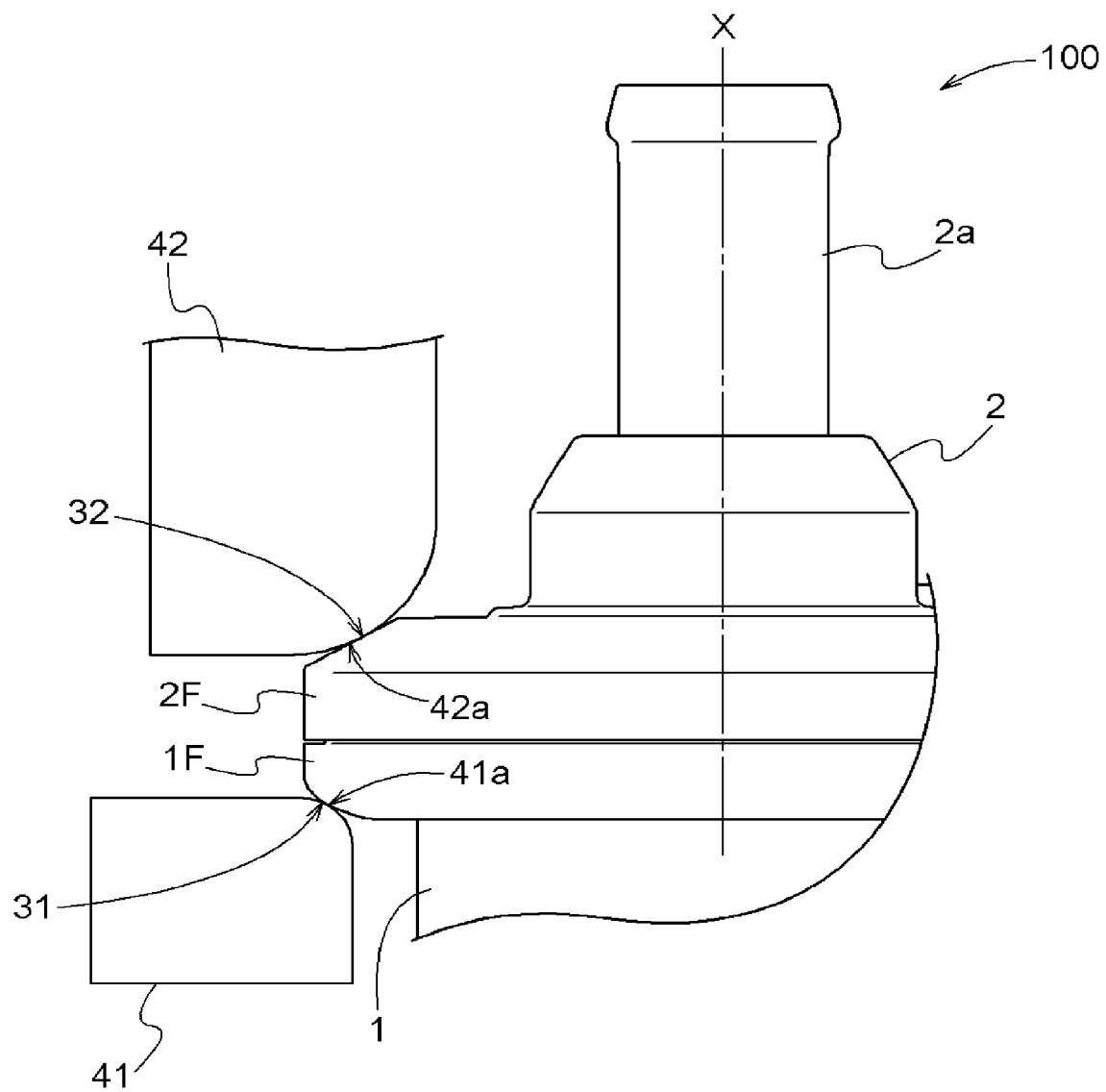
FIG. 9 is a view illustrating a modified example of the third embodiment.

As illustrated in FIG. 9, the axial alignment mechanism may be configured such that between the first pressing part 31 and the first pressing portion 41a, the first pressing part 31 is formed in an R shape, and the first pressing portion 41a is formed in an R shape. In addition, although not illustrated, the axial alignment mechanism may be configured such that all of the first pressing part 31, the first pressing portion 41a, the second pressing part 32, and the second pressing portion 42a are formed in an R shape. Another axial alignment mechanism may be configured such that between the first pressing part 31 (second pressing part 32) and the first pressing portion 41a (second pressing portion 42a), the first pressing part 31 (second pressing part 32) is formed in an R shape and the first pressing portion 41a (second pressing portion 42a) is formed in a tapered shape.

<Another Embodiment>

(1) The aforementioned embodiment describes an example in which the first pressing member 41 is the fixing base, the second pressing member 42 is the chuck member, and the second housing 2 retained by the second pressing member 42 approaches the first housing 1 supported by the first pressing member 41 during the spin welding. Instead, for example, both of the first pressing member 41 and the second pressing member 42 may be configured as the chuck member, and the first housing 1 retained by the first pressing member 41 and the second housing 2 retained by the second pressing member 42 may approach each other during the spin welding.

(2) As the thermal welding, a technology related to vibration welding (concept including ultrasonic welding) may be used. During the welding using vibration, the first welding portion 25 and the second welding portion 26 come into press contact with each other in a direction (relative movement direction) along the rotational axis X, and the first housing 1 and the second housing 2 are relatively vibrated such that the first housing 1 and the second housing 2 are joined as frictional heat is generated on contact surfaces of the first and second welding portions 25 and 26.

(3) A technology which may be used as the thermal welding is to weld the first and second welding portions 25 and 26 by heating in advance the first welding portion 25 and the second welding portion 26 using a heating plate or the like, and bringing the first and second welding portions 25 and 26 into press contact in a direction (relative movement direction) along the rotational axis X.

A feature of an axial alignment structure of a fluid pressure pump according to an aspect of this disclosure resides in that the axial alignment structure of a fluid pressure pump includes a first housing made of a resin; and a second housing made of a resin, in which a housing is configured in a state where the first housing and the second housing are joined to each other by thermal welding at a welding position, and a pump rotor is accommodated in the housing, and the first housing and the second housing have an axial alignment mechanism that axially aligns the first housing and the second housing such that axes of the first and second housings coincide with each other at the time of joining of the first housing and second housing to each other by the thermal welding.

In the fluid pump, a clearance is formed between the housing and the pump rotor after the first housing and the second housing are joined to each other. In general, high dimensional precision is typically required for the first housing, the second housing, and pressing members for pressing the first and second housings in order to set the clearance with appropriate precision. In contrast, in this configuration, the first housing and the second housing, which constitute the housing of the fluid pressure pump, have the axial alignment mechanism that axially aligns the first and second housings such that axes of the first and second housings coincide with each other at the time of joining the first housing and the second housing to each other by the thermal welding. For this reason, the first and second housings are automatically and axially aligned such that the axes thereof coincide with each other only by joining the first and second housings to each other by the thermal welding. Therefore, the clearance between the housing and the pump rotor is automatically set, and as a result, it is possible to reduce dimensional precision related to the constituent components of the housing and the pressing member other than the axial alignment mechanism. As a result, an appropriate clearance can be simply set between the housing and the pump rotor.

Another feature of the aspect of this disclosure resides in that the first housing has a first abutment portion which is formed at an inner circumferential side than the welding position and extends in an axial direction of the first housing, the second housing has a second abutment portion which comes into contact with the first abutment portion, and the axial alignment mechanism is configured such that one of the first abutment portion and the second abutment portion is formed in an R shape, and a remaining one of the first abutment portion and the second abutment portion is formed in a tapered shape or an R shape.

With this configuration, the axial alignment mechanism is configured with the first abutment portion of the first housing and the second abutment portion of the second housing, one abutment portion is formed in an R shape, and the other abutment portion is formed in a tapered shape or an R shape. With this axial alignment mechanism, at the time of joining the first housing and the second housing to each other by the thermal welding, the abutment portion having the R shape and the abutment portion having the tapered shape or the R shape come into contact with each other, and the first housing and the second housing are automatically and axially aligned such that the axes thereof coincide with each other. Therefore, a clearance between the housing and the pump rotor is automatically set, and as a result, it is possible to reduce dimensional precision related to the constituent components of the housing and the pressing member other than the axial alignment mechanism. As a result, an appropriate clearance can be simply set between the housing and the pump rotor.

Another feature of the aspect of this disclosure resides in that the first housing has a first welding portion which extends in an axial direction of the first housing and is joined with the second housing at the welding position, the second housing has a second welding portion which comes into press contact with the first welding portion, and the axial alignment mechanism is configured such that one of the first welding portion and the second welding portion is formed in an R shape, and a remaining one of the first welding portion and the second welding portion is formed in a tapered shape or an R shape.

With this configuration, the axial alignment mechanism is configured with the first welding portion of the first housing and the second welding portion of the second housing, one welding portion is formed in an R shape, and the other welding portion is formed in a tapered shape or the R shape. With the axial alignment mechanism, the first housing and the second housing are joined to each other by thermal welding in a state in which the welding portion having the R shape and the welding portion having the tapered shape or the R shape are in contact with each other, and the first housing and the second housing are axially aligned such that the axes thereof coincide with each other. Therefore, a clearance between the housing and the pump rotor is automatically set, and as a result, it is possible to reduce dimensional precision related to the constituent components of the housing and the pressing member other than the axial alignment mechanism. As a result, an appropriate clearance can be simply set between the housing and the pump rotor.

Another feature of the aspect of this disclosure resides in that the first housing has a first pressing part to which pressing force is applied toward the welding position, the second housing has a second pressing part to which pressing force is applied toward the welding position, a first pressing member having a first pressing portion configured to press the first pressing part and a second pressing member having a second pressing portion configured to press the second pressing part are provided, and the axial alignment mechanism is configured such that one of the first pressing part and the first pressing portion is formed in an R shape and a remaining one of the first pressing part and the first pressing portion is formed in a tapered shape or an R shape, and such that one of the second pressing part and the second pressing portion is formed in an R shape and a remaining one of the second pressing part and the second pressing portion is formed in a tapered shape or an R shape.

With this configuration, the axial alignment mechanism is configured with the pressing parts of the first and second housings, and the pressing portions of the first and second pressing members. One of the pressing part and the pressing portion for pressing the pressing part is formed in an R shape, and the other of the pressing part and the pressing portion is formed in a tapered shape or an R shape. With the axial alignment mechanism, the first housing and the second housing are welded in a state in which the pressing portion (pressing member) having the R shape and the pressing member (pressing portion) having the tapered shape or the R shape are in contact with each other, and the first housing and the second housing are axially aligned, such that the axes thereof coincide with each other. Therefore, a clearance between the housing and the pump rotor is automatically set, and as a result, it is possible to reduce dimensional precision related to the constituent components of the housing and the pressing member other than the axial alignment mechanism.

As a result, an appropriate clearance can be simply set between the housing and the pump rotor.

The embodiment disclosed here may be used for a fluid pressure pump having two housings joined to each other by thermal welding.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An axial alignment structure for a fluid pressure pump comprising:
    a first housing made of a resin; and
    a second housing made of a resin, wherein
    a housing is configured in a state where the first housing and the second housing are joined to each other by thermal welding at a welding position, and a pump rotor is accommodated in the housing, and
    the first housing and the second housing include an axial alignment mechanism that axially aligns the first housing and the second housing such that axes of the first and second housings coincide with each other at the time of joining of the first housing and the second housing to each other by the thermal welding,
    the first housing includes a first abutment portion which is radially inward from an inner circumferential side of the welding position, the first abutment portion having a first annular shape that extends in an axial direction of the first housing,
    the second housing includes a second abutment portion having a second annular shape that extends in an axial direction of the second housing, the second abutment portion being configured to contact the first abutment portion, and
    the axial alignment mechanism is configured such that in a flat cross-section respectively along the axial direction of the first housing and the axial direction of the second housing one of the first abutment portion and the second abutment portion includes a first curved surface, and a remaining one of the first abutment portion and the second abutment portion includes a first tapered shape or a second curved surface.

2. The axial alignment structure for a fluid pressure pump according to claim 1,
    wherein the first housing includes a first welding portion which extends in the axial direction of the first housing and is joined with the second housing at the welding position,
    the second housing includes a second welding portion which comes into press contact with the first welding portion, and
    the axial alignment mechanism is configured such that one of the first welding portion and the second welding portion includes a third curved surface, and a remaining one of the first welding portion and the second welding portion includes a second tapered shape or a fourth curved surface.

3. The axial alignment structure for a fluid pressure pump according to claim 1,
    wherein the first housing includes a first pressing part to which pressing force is applied toward the welding position,
    the second housing includes a second pressing part to which pressing force is applied toward the welding position,
    a first pressing member including a first pressing portion configured to press the first pressing part and a second pressing member including a second pressing portion configured to press the second pressing part are provided, and
    the axial alignment mechanism is configured such that one of the first pressing part and the first pressing portion includes a third curved surface and a remaining one of the first pressing part and the first pressing portion includes a second tapered shape or a fourth curved surface, and such that one of the second pressing part and the second pressing portion includes a fifth curved surface and a remaining one of the second pressing part and the second pressing portion includes a third tapered shape or a sixth curved surface.

4. An axial alignment structure for a fluid pressure pump comprising:
    a first housing made of a resin; and
    a second housing made of a resin, wherein
    a housing is configured in a state where the first housing and the second housing are joined to each other by thermal welding at a welding position, and a pump rotor is accommodated in the housing, and
    the first housing and the second housing include an axial alignment mechanism that axially aligns the first housing and the second housing such that axes of the first and second housings coincide with each other at the time of joining of the first housing and the second housing to each other by the thermal welding,
    the first housing includes a first abutment portion which is radially inward from an inner circumferential side of the welding position, the first abutment portion having a first annular shape that extends in an axial direction of the first housing,
    the second housing includes a second abutment portion having a second annular shape that extends in an axial direction of the second housing, the second abutment portion being configured to contact the first abutment portion,
    the axial alignment mechanism is configured such that one of the first abutment portion and the second abutment portion includes a first curved surface, and a remaining one of the first abutment portion and the second abutment portion includes a first tapered shape or a second curved surface,
    the first housing includes a first pressing part to which pressing force is applied toward the welding position,
    the second housing includes a second pressing part to which pressing force is applied toward the welding position,
    a first pressing member including a first pressing portion configured to press the first pressing part and a second pressing member including a second pressing portion configured to press the second pressing part are provided, and
    the axial alignment mechanism is configured such that one of the first pressing part and the first pressing portion includes a third curved surface and a remaining one of the first pressing part and the first pressing portion includes a second tapered shape or a fourth curved surface, and such that one of the second pressing part and the second pressing portion includes a fifth curved surface and a remaining one of the second pressing part and the second pressing portion includes a third tapered shape or a sixth curved surface.

* * * * *